United States Patent Office 2,883,388
Patented Apr. 21, 1959

2,883,388

SUBSTITUTED MALONONITRILES AND THE METHOD OF PREPARING SAME

David C. England, Wilmington, Del., assignor to E. I. du Pont de Nemours and Company, Wilmington, Del., a corporation of Delaware No Drawing. Application January 9, 1957
Serial No. 633,185

8 Claims. (Cl. 260—293)

This invention relates to a new class of nitriles and to their preparation.

Nitriles, particularly dinitriles containing a tertiary amine function are difficult to obtain by conventional methods and are a relatively unexplored class of compounds.

It is an object of this invention to prepare novel compounds possessing unique and valuable properties as solvents and reactive intermediates. It is a further object of this invention to obtain compounds having a tertiary amine group and a cyano group. These and other objects will become apparent from the following disclosure.

This invention permits the production of novel disubstituted malononitriles in a simple and direct manner. These compounds contain (a) as one substituent a disubstituted amine group in which the substituents on the amine group are alkyl or cycloalkyl radicals or a single divalent radical which with the nitrogen forms a heterocyclic ring and (b) as the other substituent, a halo-substituted alkyl group which contains on the alpha carbon one to two hydrogens, any halogen substituent on the alpha carbon being of atomic number 9 to 35 and which further contains on at least one beta carbon, if any are present in said halo-substituted alkyl group, at least two halogens of atomic number 9 to 17.

The compounds are characterized structurally as shown in Formula I.

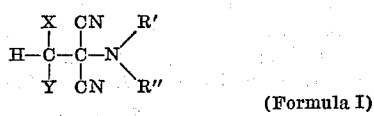

(Formula I)

X is hydrogen, a halogen of atomic number 9 to 35, an alkyl group or a haloalkyl group in which the halogens are of atomic number 9 to 17; Y is a halogen of atomic number 9 to 35 or a polyhaloalkyl group which contains on the alpha carbon at least two halogens of atomic number 9 to 17. In the preferred form of the invention X is hydrogen, a halogen of atomic number 9 to 35, an omega-hydroperfluoroalkyl or a perfluoroalkyl group of not more than 12 carbons; Y is a halogen of atomic number 9 to 17, an omega-hydroperfluoroalkyl or a perfluoroalkyl group of not more than 12 carbon atoms. R' and R" are alkyl or cycloalkyl groups; R' and R" can be a single divalent radical which in addition to carbon can contain one-ring oxygen and which with the nitrogen, forms a heterocyclic ring of not more than 6 atoms. When R' and R" are single monovalent radicals, the total number of carbon atoms in R' and R" preferably does not exceed 16. As a single divalent radical, R' and R" are preferably hydrocarbon or oxahydrocarbon groups which have at most 5 atoms of which not more than one is oxygen.

Examples of this new class of compounds are dichloromethyldiethylaminomalononitrile, difluoromethyldiethylaminomalononitrile, chlorofluoromethyldihexylaminomalononitrile, 1H-tetrafluoroethylmorpholinomalononitrile, 2-(2H-hexafluoropropyl)dipropylaminomalononitrile, 1H,3H-pentafluoropropyldicyclohexylaminomalononitrile, monofluoromethyldioctylaminomalononitrile, chlorofluoromethyl-N-methyl-N-cyclohexylaminomalononitrile, bromofluoromethyldihexylaminomalononitrile, 1H,7H - tridecafluoroheptyldipropylaminomalononitrile, di(perfluorododecyl)-dimethylaminomalononitrile and (1H-3,5,7,9,11,12-hexachlorooctadecylfluorododecyl)dimethylaminomalononitrile.

These new compounds are, for the most part, colorless liquids or solids which can be distilled readily under reduced pressure. They are stable on storage in glass containers at ordinary temperatures and are not readily oxidized on exposure to air. The compounds are insoluble in and heavier than water. They are soluble in a broad range of organic solvents such as alcohol, ether, acetone, dioxane and dimethylformamide.

The substituted malononitriles of this invention can be prepared by reacting liquid hydrogen cyanide with a tertiary amine of the structure shown in Formula II.

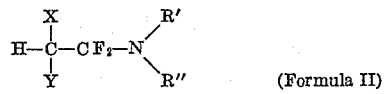

(Formula II)

X, Y, R' and R" have the same meaning as in Formula I. The preparation and properties of the compounds of Formula II are known in the art and have been described, for example, by Pruett et al. in J. Am. Chem. Soc. 72, 3646 (1950). The reaction for the preparation of the substituted malononitriles is shown in the following equation:

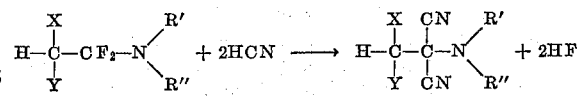

The compounds of this invention can also be prepared by reacting the tertiary amine of Formula II with cyanic acid whereby one fluorine is replaced by an isocyanate group, followed by reaction with hydrogen cyanide whereby the remaining fluorine atom and the isocyanate group are replaced with cyano groups. This is illustrated by the following equations:

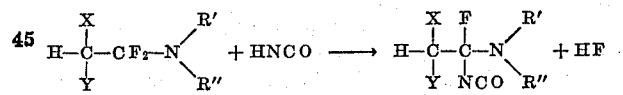

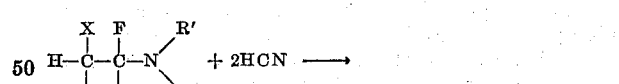

In the process for preparing the compounds of this invention the molar ratio of hydrogen cyanide to the fluorine-containing tertiary amine is at least 2 to 1 and preferably is slightly in excess of 2 to 1. A molar ratio of hydrogen cyanide to tertiary amine of less than 2 to 1 results in incomplete reaction with the fluorine substituents and yields a mixture of products. The reaction may be conducted in the presence of a fluorine-exchange catalyst, such as sodium fluoride, but this is not essential.

Although the reactions as described in the examples that follow were conducted at 10° C. or lower, they can be conducted at higher temperatures, particularly when tertiary amines containing long chain substituents are employed. In such cases, temperatures up to 50° C. may be employed. The time of the reaction can vary from as low as five minutes to as long as 20 hours.

A convenient method for carrying out the reaction is as follows: The hydrogen cyanide and the fluorine-containing tertiary amine are separately cooled to 10° C. or lower. The tertiary amine is then added slowly to hydrogen cyanide at 10° C. or lower. The mixture is stirred thoroughly while the reaction is in progress. The reaction is vigorous and, as it proceeds and subsides in vigor, the temperature of the reaction mass is allowed to rise gradually to the existing atmospheric temperature. The reaction mass is then poured into water. The heavy oil which separates and the supernatant water layer are extracted with a water-immiscible polar organic solvent such as diethyl ether, dibuytl ether and chloroform. The liquid extracts are dried, the solvent is removed by evaporation or distillation, and the residue is distilled, preferably under reduced pressure, to yield the pure substituted malononitrile.

In the optional procedure in which the fluorine-containing tertiary amine is reacted with cyanic acid and then with hydrogen cyanide the reaction procedure is substantially the same as that described above. An example of an intermediate isocyanate compound which can be obtained in this procedure is diethyl(1,2,2,-trifluoro-1-isocyanatoethyl)amine.

The following examples, in which parts are given by weight, will illustrate the preparation of compounds of this invention.

Example 1

This example illustrates the preparation of (1) a fluorine-containing tertiary amine and (2) its reaction with hydrogen cyanide in the absence of a catalyst to form a malononitrile containing difluoroalkyl and dialkylamino substituents.

A pressure reactor fabricated from borosilicate glass and fitted with a gas entry tube, a thermocouple well and means for shaking was charged with 100 parts of freshly distilled diethylamine. The reactor was then pressured to 40 lbs./sq. in. gauge with gaseous tetrafluoroethylene while shaking. The reaction was continued for approximately 40 hours at room temperature during which time gaseous tetrafluoroethylene was added as needed to maintain the internal pressure at 40 lbs./sq. in. gauge. A total of 85 parts of tetrafluoroethylene was absorbed. The crude liquid reaction product was distilled through a fractionating column under reduced pressure to give 99 parts of diethyl(1,1,2,2-tetrafluoroethyl)amine, boiling 58–60° C./110 mm.

A platinum reaction vessel, cooled in ice, was charged with 35 parts of hydrogen cyanide. There was then added dropwise with stirring 57 parts of diethyl(1,1,2,2-tetrafluoroethyl)amine. The mixture was stirred for 15 minutes while warming to room temperature and then poured into water. The heavy oil and supernatant water layer were extracted with diethyl ether, the ether solution dried with anhydrous magnesium sulfate, and distilled. There was obtained 56.2 parts of difluoromethyl-diethylaminomalononitrile, boiling at 54° C. at 1 mm. mercury pressure; $n_D^{25}$, 1.4091.

Example 2

This example illustrates the use of a fluorine-exchange catalyst in the reaction of Example 1.

A mixture of 10 parts of sodium fluoride and 69 parts of hydrogen cyanide was placed in a glass reaction vessel and cooled in an ice-salt bath. There was added rapidly with vigorous stirring 19 parts of diethyl(1,1,2,2-tetrafluoroethyl)amine. When the reaction vessel was removed from the ice-salt bath and warmed gradually a vigorous reaction ensued. The reaction product was poured into water and processed as in Example 1. There was obtained 13 parts of difluoromethyldiethylaminomalononitrile, boiling at 61° C. at 2 mm. of mercury pressure. The structure of the compound was confirmed by its nuclear magnetic resonance spectrum. A sample of the compound obtained in a repeat experiment analyzed as follows:

Calc'd for $C_8H_{11}F_2N_3$: C, 51.4%; H, 5.9%; F, 20.3%; N, 22.4%. Found: C, 51.5%; H, 5.77%; F, 20.37%; N, 20.64%, 20.91%.

Example 3

This example illustrates the preparation of a substituted malononitrile containing tetrahaloalkyl and dialkylamino substituents.

The tertiary amine, diethyl(1,1,2,3,3,3-hexafluoropropyl)amine, was prepared by reacting hexafluoropropene and diethylamine in a manner similar to that described in Example 1. The tertiary amine boiled at 54° C. at 50 mm. pressure.

A polyethylene vessel was charged with 35 parts of hydrogen cyanide and cooled in an ice-water bath. There was added dropwise with stirring 78 parts of diethyl(1,1,2,3,3,3-hexafluoropropyl)amine. After addition was complete the reaction mass was warmed to room temperature and processed as in Example 1. There was obtained 57 parts of 1,2,2,2-tetrafluoroethyldiethylaminomalononitrile which boiled at 59° C. at 1 mm. pressure; $n_D^{25}$, 1.3930. Analytical data are as follows:

Calc'd for $C_9H_{11}N_3F_4$: N, 17.7%; F, 32.0%. Found: N: 17.8%, F, 32.4%.

Example 4

This example illustrates the preparation of a substituted malononitrile containing chlorofluoroalkyl and dialkylamino substituents.

The tertiary amine, diethyl(2-chloro-1,1,2-trifluoroethyl)amine, was prepared by reaction of chlorotrifluoroethylene with diethylamine, using a procedure similar to that described in Example 1. This compound boiled at 37° C. at 10 mm. pressure of mercury and fumed in moist air.

A platinum vessel was charged with 35 parts of dry hydrogen cyanide and cooled by an ice-water bath. There was then added dropwise with stirring 64 parts of diethyl(2-chloro-1,1,2-trifluoroethyl)amine. After addition was complete the reaction mass was warmed to room temperature and poured into water and processed as in Example I. There was obtained 48 parts of chlorofluoromethyldiethylaminomalononitrile, boiling at 70° C. at 1 mm. pressure of mercury; $n_D^{25}$, 1.4412. The analytical data are as follows:

Calc'd for $C_8H_{11}N_3ClF$: N, 20.6%; Cl, 17.4%; F, 9.3%. Found: N, 20.8%; Cl, 17.4%; F, 9.3%.

Example 5

This example illustrates the preparation of a substituted malononitrile containing chloroalkyl and dialkylamino substituents.

The tertiary amine, dimethyl(2,2-dichloro-1,1-difluoroethyl)amine, was prepared by heating a mixture of 32 parts of 1,1-dichloro-2,2-difluoroethylene and 13.6 parts of dimethylamine in a sealed hard glass tube (Carius tube) at 50° C. for 1 hour. The liquid product, which was decanted from the reaction mixture, was distilled to yield 7.8 parts of dimethyl(2,2-dichloro-1,1-difluoroethyl)amine, boiling at 42° C. at 10 mm. pressure of mercury.

A platinum vessel was charged with 4.9 parts of hydrogen cyanide and cooled by an ice-water bath. There was then added dropwise with vigorous stirring 6.5 parts of dimethyl(2,2-dichloro-1,1-difluoroethyl)amine. When the ice-water bath was removed, a vigorous reaction occurred, leaving a crystalline solid in the platinum dish. An additional 2.1 parts of hydrogen cyanide was added to insure that an excess of the cyanide was present. The mixture was poured into cold water, the solid separated by filtration and dried in air. There was obtained 5.3 parts of crude product which, after recrystallization from cyclohexane, yielded 4.5 parts of dichloromethyldimethylaminomalononitrile, melting at 103.5 to 105° C. The analytical data are as follows:

Calc'd for $C_6H_7N_3Cl_2$: N, 21.9%; Cl, 37.0%. Found: N, 21.8%; Cl, 36.6%.

Example 6

This example illustrates the preparation of a substituted malononitrile containing difluoroalkyl and pyrrolidinyl substituents.

The tertiary amine, N-(1,1,2,2-tetrafluoroethyl)pyrrolidine, was prepared by reaction of tetrafluoroethylene with pyrrolidine, using a procedure similar to that described in Example 1. The boiling point of the tertiary amine was 72° C. at 100 mm.

A platinum vessel was charged with 17.5 parts of dry hydrogen cyanide and cooled in an ice-water bath. There was then added dropwise and with stirring 15 parts of N-(1,1,2,2-tetrafluoroethyl)pyrrolidine. After addition was complete the reaction mass was processed as in Example 1. There was obtained 13.5 parts of difluoromethylpyrrolidinylmalononitrile, B.P., 66° at 2 mm. pressure; $n_D^{25}$, 1.4285. The analytical data are as follows:

Cal'd for $C_8H_9N_3F_2$: N, 22.7%; F, 20.5%. Found: N, 22.2%; F, 20.6%.

Example 7

This example illustrates the preparation of a substituted malononitrile containing difluoroalkyl and piperidino substituents.

The tertiary amine, N-(1,1,2,2-tetrafluoroethyl)piperidine, was prepared by reaction of tetrafluoroethylene and piperidine using a procedure similar to that described in Example 1. The tertiary amine boiled at 84° C. at 100 mm. pressure.

A vessel made of polyethylene was charged with 28 parts of hydrogen cyanide, cooled in ice-water, and 53 parts of the above tertiary amine were added with stirring. After warming to room temperature, the reaction mass was processed as in Example 1. There was obtained 48 parts of difluoromethylpiperidinomalononitrile; B.P. 72° C. at 2 mm. pressure; $n_D^{25}$, 1.4378. The analytical data are as follows:

Calc'd for $C_9H_{11}N_3F_2$: N, 21.1%; F, 19.1%. Found: N, 20.3%; F, 18.9%.

Example 8

This example illustrates the preparation of a substituted malononitrile containing tetrafluoroalkyl and pyrrolidinyl substituents.

The tertiary amine, N-(1,1,2,3,3,3-hexafluoropropyl)pyrrolidine, was prepared by reacting pyrrolidine and hexafluoropropene in a manner similar to that described in Example 1. The tertiary amine boiled at 65° C. under 50 mm. pressure.

A platinum vessel was charged with 17.5 parts of hydrogen cyanide, cooled in ice-water and 26 parts of the above tertiary amine added slowly with vigorous stirring. After warming to room temperature, the reaction mass was processed as in Example 1. There was obtained 12 parts of 1,2,2,2-tetrafluoroethylpyrrolidinylmalononitrile; B.P., 66° C. at 2 mm. pressure; $n_D^{25}$, 1.4082. The analytical data are as follows:

Calc'd for $C_9H_9N_3F_4$: N, 17.8%; F, 32.4%. Found: N, 16.2%; F, 32.8%.

Example 9

This example illustrates the preparation of a substituted malononitrile by reaction of a fluorine-containing tertiary amine with cyanic acid and with hydrogen cyanide.

A solution of 40.9 parts of cyanic acid was prepared in approximately 70 parts of diethyl ether and cooled in a solution of solid carbon dioxide in acetone. There was then added dropwise with stirring 54 parts of diethyl (1,1,2,2-tetrafluoroethyl)amine. The mixture was allowed to warm to room temperature with continuous stirring, filtered and the residue distilled under reduced pressure to yield 42.7 parts of crude product. It was redistilled to give diethyl(1 - isocyanato - 1,2,2-trifluoroethyl)amine, boiling at 80° C. at 1 mm. pressure; $n_D^{25}$, 1.4500. The compound reacted quite readily with water, liberating fluoride ion. The analytical data and nuclear magnetic resonance spectrum confirmed its structure. The analytical data were:

Calc'd for $C_7H_{11}N_2OF_3$: N, 14.3%; F, 29.1%. Found: N, 15.0%; F, 28.1%.

The isocyanato-substituted product (10 parts) was then reacted with 14 parts of liquid hydrogen cyanide at 0° C., using the procedure described in Example 1. After filtration to remove a gummy product, the liquid residue was distilled fractionally under reduced pressure to yield 3.4 parts of difluoromethyldiethylaminomalononitrile, boiling point 60° C. at 2 mm. mercury pressure.

While the process for preparing the compounds of this invention has been illustrated with reference to certain specific tertiary amines it is broadly applicable to any tertiary amine having a difluoromethylene group attached to the nitrogen, that is, tertiary amines which have as part of their structure the group, $>N-CF_2-$. Examples of tertiary amines which can be used in the process are dipropyl(1,1,2-trifluorobutyl)amine to yield (1-fluoropropyl)dipropylaminomalononitrile, N-(2-chloro-1,1,2-trifluoroethyl)morpholine to yield chlorofluoromethylmorpholinomalononitrile, diethyl(2H,8H-perfluorooctyl)-amine to yield (1H,7H-perfluoroheptyl)diethylaminomalononitrile and dimethyl-(2H,12H-perfluorododecyl)-amine to yield (1H,11H-perfluoroundecyl)dimethylaminomalononitrile.

The compounds of this invention are useful as latent solvents for coalescing polyvinyl fluoride powder into films. To illustrate, powdered polyvinyl fluoride was mixed with sufficient difluoromethyldiethylaminomalononitrile to form a plastisol. The plastisol was spread on a section of chromium plated sheet metal which was then heated until coalescence of the polyvinyl fluoride and evaporation of the liquid was complete. The film was clear and adhered tenaciously to the plate. When the plate, while still hot, was immersed in cold water, a clear film of polyvinyl fluoride was stripped from the surface.

I claim:

1. A method for preparing substituted malononitriles which comprises reacting liquid hydrogen cyanide with a tertiary amine of the formula

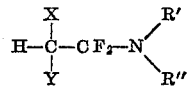

wherein X is selected from the group consisting of hydrogen, halogen of atomic number of 9–35, alkyl of from 1 to 8 carbon atoms and haloalkyl groups having from 1 to 8 carbon atoms and in which the halogens are of atomic number 9–17; Y is selected from the group consisting of halogen of atomic number 9–35 and polyhaloalkyl groups of from 1 to 25 carbon atoms, the polyhaloalkyl group containing on the alpha carbon at least two halogens of atomic number 9–17; R' and R" are selected from the group consisting of alkyl of from 1 to 8 carbon atoms, cycloalkyl of up to 8 carbon atoms, morpholino, piperidino and pyrrolidinyl groups, the molar ratio of hydrogen cyanide to the fluoride-containing tertiary amine being at least 2:1.

2. A method for preparing substituted malononitriles which comprises reacting a tertiary amine of the formula

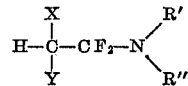

wherein X is selected from the group consisting of hydrogen, halogen of atomic number 9–35, alkyl of from 1 to 8 carbon atoms, and haloalkyl of from 1 to 8 carbon atoms and in which the halogens are of atomic number 9–17; Y is selected from the group consisting of halogen of atomic number 9–35 and polyhaloalkyl groups of from 1 to 25 carbon atoms, the polyhaloalkyl group containing on the alpha carbon at least two halogens of atomic number 9–17; R' and R" are selected from the group consisting of alkyl of from 1 to 8 carbon atoms, cycloalkyl of up to 8 carbon atoms, morpholino, piperidino and pyrrolidinyl groups; with cyanic acid and reacting the thusly formed product with hydrogen cyanide, the total molar ratio of hydrogen cyanide to the fluorine-containing tertiary amine being at least 2:1.

3. Substituted malononitriles of the formula

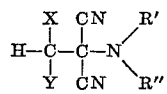

wherein X is selected from the group consisting of hydrogen, halogen of atomic number 9–35, alkyl of from 1 to 8 carbon atoms and haloalkyl of from 1 to 8 carbon atoms and in which the halogens are of atomic number 9–17; Y is selected from the group consisting of halogen of atomic number 9–35 and polyhaloalkyl groups of from 1 to 25 carbon atoms, the polyhaloalkyl group containing on the alpha carbon at least two halogens of atomic number 9–17; and R' and R" are selected from the group consisting of alkyl of 1 to 8 carbon atoms, cycloalkyl of up to 8 carbon atoms, morpholino, piperidino and pyrrolidinyl radicals.

4. Difluoromethyldiethylaminomalononitrile.
5. 1,2,2,2-tetrafluoroethyldiethylaminomalononitrile.
6. Dichloromethyldimethylaminomalononitrile.
7. Difluoromethylpiperidinomalonontrile.
8. 1,2,2,2-tetrafluoroethylpyrrolidinylmalononitrile.

No references cited.

UNITED STATES PATENT OFFICE
CERTIFICATE OF CORRECTION

Patent No. 2,883,388 April 21, 1959

David C. England

It is hereby certified that error appears in the printed specification of the above numbered patent requiring correction and that the said Letters Patent should read as corrected below.

Column 2, line 7, for "rododecyl)-dimethylaminomalononitrile" read -- rododecyl)methyldimethylaminomalononitrile --.

Signed and sealed this 25th day of August 1959.

(SEAL)

Attest:

KARL H. AXLINE

Attesting Officer

ROBERT C. WATSON

Commissioner of Patents